United States Patent [19]

Shanklin

[11] E Re. 30,010

[45] Reissued May 29, 1979

[54] PACKAGING APPARATUS AND METHOD

[75] Inventor: F. Garrett Shanklin, Hemlock Park Dr., Groton, Mass. 01450

[73] Assignee: Frank Garrett Shanklin, Groton, Mass.

[21] Appl. No.: 716,879

[22] Filed: Aug. 23, 1976

Related U.S. Patent Documents

Reissue of:

[64] Patent No.: 3,583,889
Issued: Jun. 8, 1971
Appl. No.: 814,900
Filed: Apr. 10, 1969

[51] Int. Cl.[2] ..... B65B 9/12; B65B 41/12; B65B 61/10

[52] U.S. Cl. ..... 53/552; 53/568; 53/389; 112/138; 226/197

[58] Field of Search ..... 53/177, 28, 180 R, 180 M, 53/182 R, 182 M, 373, 389, 390, 64, 74, 220, 228; 223/39; 156/465, 466; 226/196, 197, 199; 93/33 H; 270/40; 112/138

[56] References Cited

U.S. PATENT DOCUMENTS

| | | | |
|---|---|---|---|
| 1,320,456 | 11/1919 | De Voe | 112/138 |
| 2,278,043 | 3/1942 | Sailer | 112/138 |
| 2,376,646 | 5/1945 | Ackerman et al. | 112/138 |
| 2,718,738 | 9/1955 | Mast et al. | 53/64 |
| 2,947,127 | 8/1960 | Herman | 53/182 |
| 3,035,381 | 5/1962 | Hosso | 53/373 X |
| 3,047,991 | 8/1962 | Siegal et al. | 53/373 X |
| 3,122,361 | 2/1964 | Moore | 270/40 |
| 3,223,571 | 12/1965 | Straughan | 53/180 X |
| 3,420,035 | 1/1969 | Deans et al. | 53/182 |
| 3,427,781 | 2/1969 | Kral | 53/182 X |
| 3,429,100 | 2/1969 | Zelnick et al. | 53/182 |
| 3,431,831 | 3/1969 | McGill et al. | 93/82 |
| 3,478,486 | 11/1969 | Treiber | 53/64 |
| 3,494,096 | 2/1970 | Suzuki | 53/183 |
| 3,519,263 | 7/1970 | Frick | 270/40 |
| 3,538,676 | 11/1970 | Runo et al. | 53/373 X |
| 3,619,970 | 11/1971 | Zelnick | 53/389 X |
| 3,732,789 | 5/1973 | Hartleib | 53/180 X |
| 3,780,628 | 12/1973 | McGill et al. | 53/177 X |

*Primary Examiner*—Horace M. Culver
*Attorney, Agent, or Firm*—Charles E. Pfund

[57] ABSTRACT

An automatic package wrapping apparatus of the L-scaler type. The packages to be wrapped are transported through the apparatus in a straight line one by one and in so doing pass through a film inverting head where they are surrounded by a pre-folded thermoplastic film. The film is supplied from the rear of the apparatus in a prefolded condition and is both turned inside out and redirected into a path corresponding to the path of the packages through the apparatus in the film inverting head. Also that method of wrapping packages wherein a generally U-shaped inverting head is provided, wherein a length of longitudinally pre-folded thermoplastic film is passed over and then through said head thereby turning the film inside out and redirecting its path and wherein the package to be wrapped is passed through said inverting head thereby surrounding itself with said film.

1 Claim, 10 Drawing Figures

INVENTOR
FRANK GARRETT SHANKLIN
BY,
Porter & Meyer
ATTORNEYS

INVENTOR
FRANK GARRETT SHANKLIN
BY, Porter & Meyer
ATTORNEYS

INVENTOR
FRANK GARRETT SHANKLIN
BY, Porter & Meyer
ATTORNEYS

INVENTOR
FRANK GARRETT SHANKLIN
BY, Porter & Meyer
ATTORNEYS

INVENTOR
FRANK GARRETT SHANKLIN
BY, Porter & Meyer
ATTORNEYS

INVENTOR
FRANK GARRETT SHANKLIN
BY, Porter & Meyer
ATTORNEYS

PACKAGING APPARATUS AND METHOD

Matter enclosed in heavy brackets [ ] appears in the original patent but forms no part of this reissue specification; matter printed in italics indicates the additions made by reissue.

SUMMARY OF THE INVENTION

L-type sealing machines have become quite popular in recent years, especially for overwrapping a variety of packages such as those, for example, containing phonograph records or toys with a shrinkable thermoplastic film. The L-type sealer employs pre-folded film and simultaneously forms a transverse seal and a longitudinal seal with the longitudinal seal located opposite and parallel to the pre-folded edge of the film. Normally a hot wire impulse type sealing means is used so regulated that the wire both severs the film and forms a seal on both sides of the severed portion. Thus the final transverse seal of one package is the initial transverse seal of the next package and a package is formed with each cycle of the sealing jaws.

Normally in such machines the film is pre-folded and passes in a straight line through the machine with the folded edge toward the rear and the free edges toward the front. The package to be overwrapped is inserted from the front between the free edges. Frequently, a shelf-like structure is provided that extends between the free edges of the film to facilitate the insertion of the articles to be overwrapped. Some efforts have been made to make such machines automatic, but these have turned out to be quite complicated due to the fact that the packages are fed from the front at essentially right angles to the path of the film; that the film must be separated to admit the package and that after being surrounded by film the package must move at right angles to its previous path.

One problem is that a web of a pre-folded film does not maintain its track properly when a 3-dimensional package is inserted into it. Essentially what happens is that the film opens in such a way that the bottom layer of the film lays flat under the shelf or table on which the package is placed, whereas the top web of film has to wrap around three sides of the package. This obviously would displace the free edge of the top layer relative to the free edge of the bottom layer. If the packages were wrapped individually this would be of little importance. But where multiple packages are made with a common, through severed, seam between packages, the inaccuracies of the first package tend to multiply in each succeeding package.

It is the object of this invention to provide an automatic wrapping machine of the L-seal type wherein the articles to be wrapped are transported through the apparatus one by one in a straight line. Another object of this invention is to provide means whereby the articles to be packaged or overwrapped surround themselves with film solely through the motion of the said articles through the machine. A further object of this invention is to provide means for overwrapping articles with pre-folded film which means are essentially self-centering. These and other objects of the invention will become apparent from the drawing and from the detailed description which follows:

DETAILED DESCRIPTION OF THE INVENTION

Figure 1:
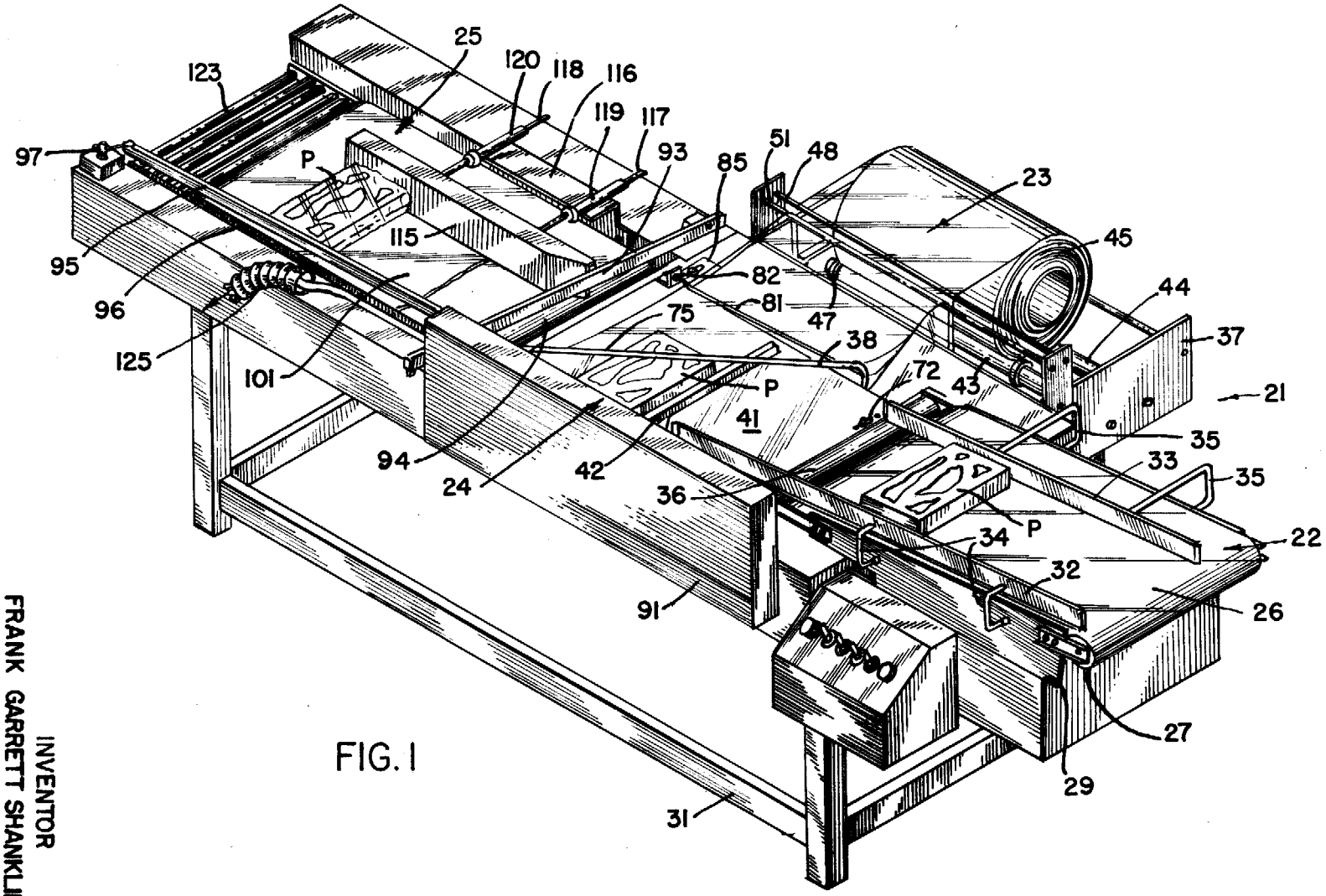
FIG. 1 is a front perspective view of the packaging apparatus of the present invention.
Figure 2:
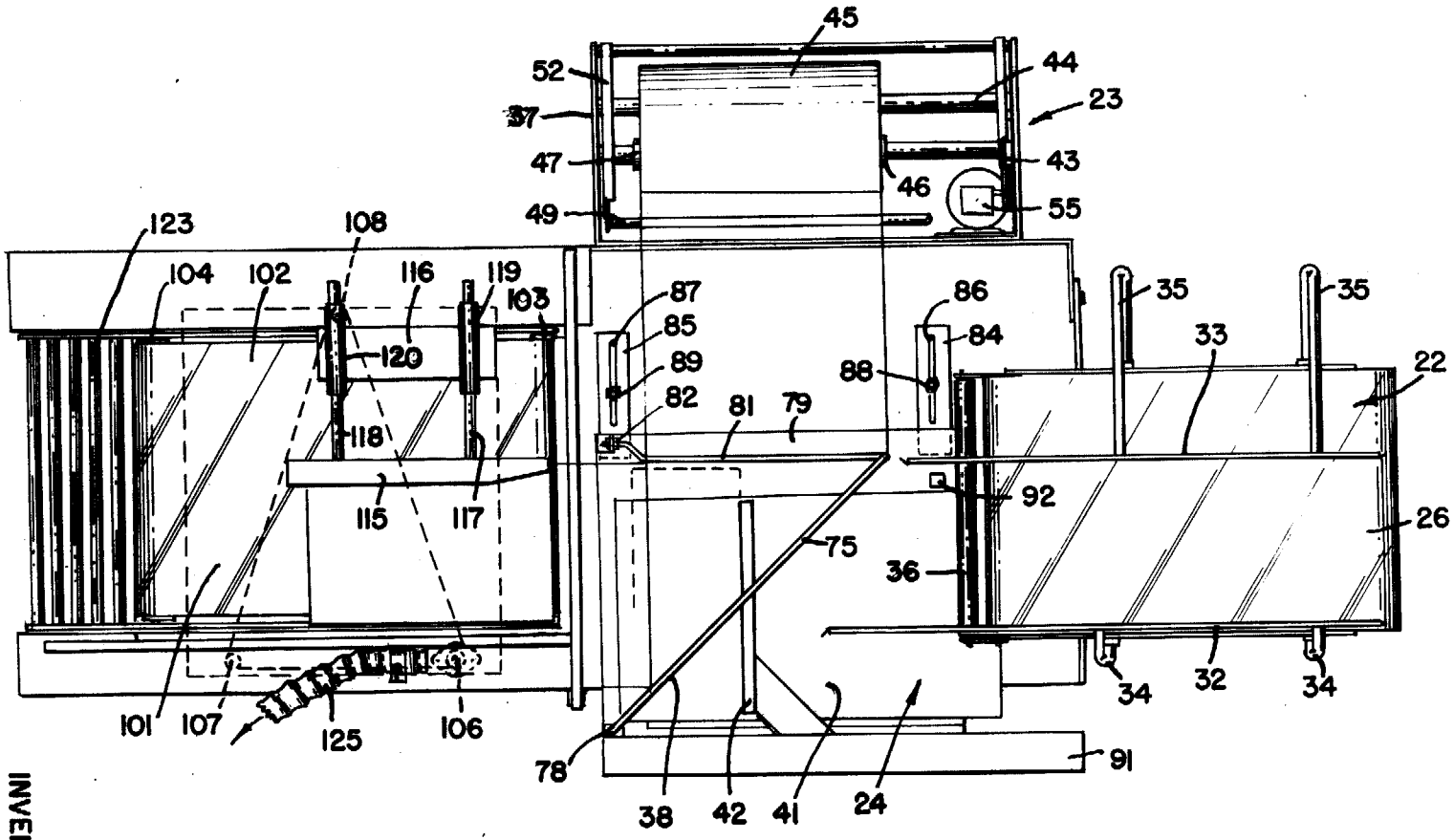
FIG. 2 is a top view of the apparatus of FIG. 1.

The packaging apparatus of the present invention indicated generally at 21 comprises a package infeed section indicated generally at 22, a film unwind and inverting section indicated generally at 23, a package insert section indicated generally at 24 and a sealing section indicated generally at 25.

The package infeed section, indicated generally at 22, comprises a package infeed conveyor 26 mounted on two rollers 27 and 28 which in turn are mounted on extension 29 of main frame 31. The upper surface of infeed conveyor 26 is provided with a pair of parallel guides 32 and 33 adapted to cause packages (indicated at P) to follow a predetermined path along conveyor 26. Guides 32 and 33 are mounted on U-shaped support arms indicated at 34 in the case of guide 32 and at 35 in the case of guide 33, which in turn are mounted in extension frame 29 in such manner as to permit the lateral adjustment of guides 32 and 33 to the desired position. Conveyor 26 is provided about as wide as the maximum size package intended to be handled and guides 32 and 33 are mounted to be fully adjustable in or out to adjust for package width. It will be noted however that front guide 32 requires but little adjustment since in a particular machine the edge of the package P adjacent the front is lined up generally with the front sealing jaw in sealing section 25 on its straight line passage through the machine. The terms front and rear as used herein are related to the orientation of the film in sealing section 25. The folded edge of the film is deemed to be toward the rear, the free edges toward the front.

Infeed conveyor 26 terminates above table 41 of package-inserting section 24. Guides 32 and 33 extend above table 41 for an appreciable distance with sufficient clearance from table 41 to permit passage of insertion arm 42 between the bottom of guides 32 and 33 and the top of table 41. The package apparatus of the present invention operates intermittently as will be explained below, and for this reason the infeed conveyor 26 is provided with a motor and with a clutch/brake mechanism (not shown) to permit conveyor 26 to start and stop rapidly. The input end of conveyor 26 is adapted to receive the packages from a conveyor (not shown) associated with the package assembly operation. Preferably, but not necessarily, lead roller 27 is at a higher elevation than trailing roller 28 so that conveyor 26 slants slightly towards table 41.

The operating requirements of package infeed conveyor 26 are that it deliver the packages to be overwrapped one by one onto table 41 of the package-inserting section 24. Since package infeed conveyor 26 operates intermittently its ability to accomplish this requirement depends largely upon the rate and regularity of the delivery of packages to it. Where the packages are fed from a continuously operating conveyor at a sufficient volume it may be possible under certain conditions to form a continuous line of packages on infeed conveyor 26 and to force packages off conveyor 26 onto table 41 even though conveyor 26 has stopped. When this is a possibility a clamping mechanism (not shown) is provided on one of the guides 32 or 33 to clamp any package therebetween and to prevent its movement. Such clamping means when provided is so actuated that it becomes operative whenever infeed conveyor 26 is stopped and becomes inoperative whenever infeed conveyor 26 is operating. More frequently it is merely necessary to separate successive packages to insure that only one at a time reaches table 41 of package inserting section 24. This is most easily accomplished by providing an accelerator roll 36 at the end of infeed conveyor 26 beyond conveyor roller 28. Accelerator roll 36 is run at a substantially higher peripheral speed than infeed conveyor 26 and therefore speeds up the package contacting it separating that package from the next succeeding one.

The film unwind and inverting section indicated generally at 23 comprises a film unwind stand 37 and a film inverting head 38. Film inverting head 38, which is a generally U-shaped member with horizontal arms, is located with one arm above and one arm below table 41 of package-inserting section 24, and in normal configuration is oriented at 45° to the path of travel of packages through packaging apparatus 21.

Figure 3:
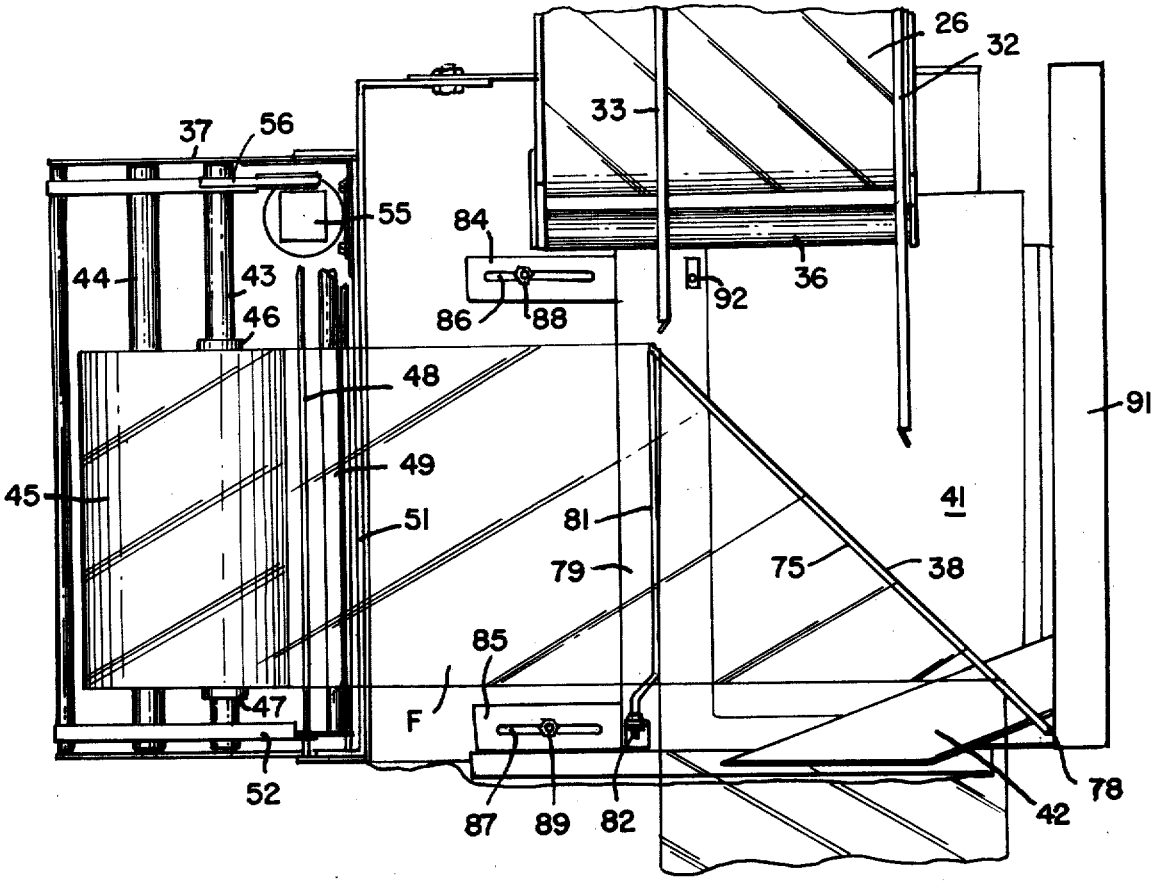
FIG. 3 is a top view of the film feed and the film inserting portion of the apparatus of FIG. 1.
Figure 4:
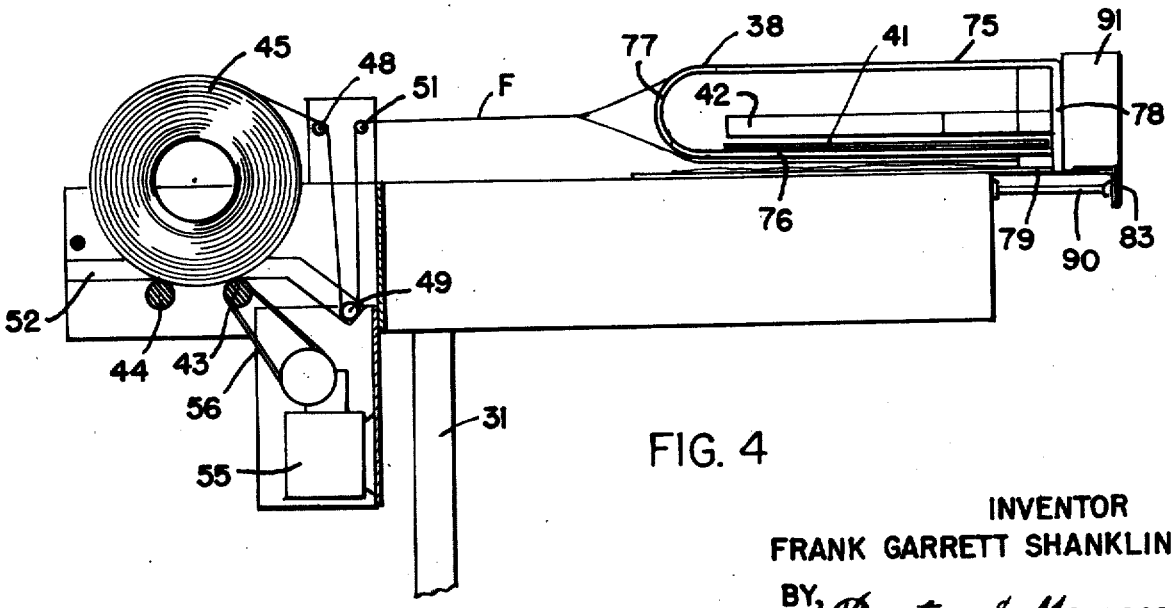
FIG. 4 is a side elevation corresponding to FIG. 3.
Figure 5:
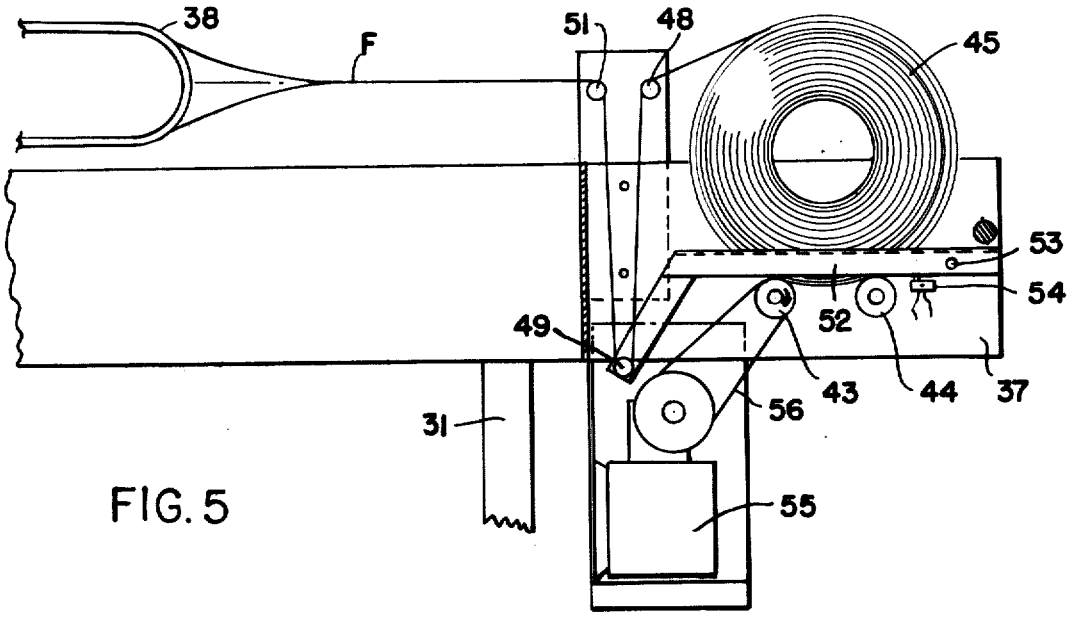
FIG. 5 is a side elevation corresponding to FIG. 4 but showing the opposite side.

Film unwind stand 37 which is located to the rear of packaging apparatus 21 (see also FIGS. 3, 4 and 5) comprises two parallel rollers 43 and 44 adapted to cradle a roll 45 of folded film F in such manner in the normal set up that the axis of the roll 45 of film is parallel to the path of travel of packages P through apparatus 21. Cradle roller 43 is provided with two adjustable clamping collars 46 and 47 to adjust the axial position of roll 45 of film F.

It has been found desirable for smooth operation of the apparatus to provide a motorized film unwind for two reasons. In the first place the motorized unwind provides tension-free film F to go over and through the film inverting head 38 where since friction is a function of web tension, the reduction in tension reduces friction and makes everything work easier. Secondly it is much more difficult to obtain good seals on a package if the film is under tension while the seal is being made. This is particularly true in an L-type sealer incorporating a hot wire impulse seal such as in the present apparatus because as the seal is made, the film is cut and if there is tension in the film, the two pieces will tend to pull away from the seal area. This causes a short and unpredictable exposure of the film in the seal region to the heat sealing element and it also releases the pressure clamping the top and bottom webs of film together. In certain types of shrink film, the film starts to shrink so rapidly from the sealing heat that the top and bottom webs curl away from each other and do not fuse together unless they are properly clamped. This problem is particularly serious in the case of an L-type sealer such as the one incorporated in the present apparatus where the transverse sealing jaw forms both the final seal on the first package and a first seal on the following simultaneously, and where the film is unwound by pressing the succeeding package against the first seal because a poor seal in the first seal area will allow the package to break through without feeding film, resulting in a shut down in the machine.

In the motorized film unwind film F as it is unwound from roll 45 is passed over a first idler roll 48 under a dancer roll 49 over a second idler roll 51 and then onto inverting head 38. Dancer roll 49 is mounted on dancer roll carrier 52 which in turn is pivoted at 53 to the rear of unwind stand 37. As film F is pulled through inverting head 38 by the passage of packages P dancer roll 49 is caused to rise rotating dancer roll carrier 52 about pivot 53. At a predetermined point the rotation of dancer roll carrier 52 releases limit switch 54 which actuates gear motor 55 which in turn through belt 56 rotates cradle roll 43 causing the film F to unwind from roll 45. As the film is unwound, dancer roll 49 drops until at a predetermined level dancer roll carrier 52 reactivates limit switch 54 shutting off gear motor 55. Preferably the two idler rolls 48 and 51 are at approximately the same level and the working range of dancer roll 49 is, of course, below the level of the idler rolls. Gear motor 55 is provided with a reverse switch so that it may be run in either direction depending on which way the film in roll 45 has been wound. The folded edge of film F will always be to the right as shown in FIG. 1. For reasons that will be explained below means (not shown) are provided to adjust the vertical position of idler rolls 48 and 51.

Figure 6:
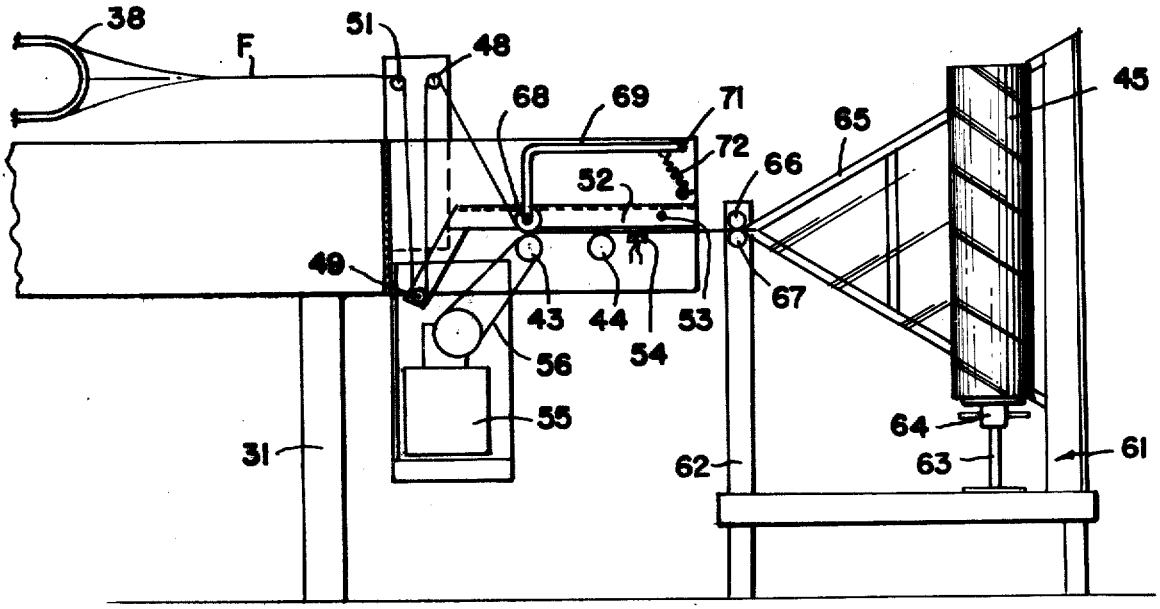
FIG. 6 is a side elevation corresponding generally to FIG. 5 but showing an alternate film feed means.

A modification of the film unwind section is shown in FIG. 6 where packaging apparatus 21 is adapted to the use of flat film rather than pre-folded film. In such instances a prefolding section 61 may be provided. Prefolding section 61 comprises a stand 62, vertical film roll holding spindle 63 mounted on said stand and means 64 mounted on said spindle for adjusting the elevation of a roll of film 45 mounted on spindle 63. Film F from roll 45 is passed over V-shaped folding head 65 and the two edges of the film are directed toward the rear as seen in FIG. 6. The two sides of the center-folded film are brought into face to face contact upon passing through horizontal squeeze rolls 66 and 67. As used in the context of this application the term "center-folded film" is intended to include not only those instances where the fold is precisely in the center, and the two edges mate, but also those instances where the fold is not precisely in the center and the two edges are somewhat offset as in the case of the so-called "J-folded film." In the case of a folding head 65 as shown in FIG. 6 the difference is based on whether or not the center line of the roll 45 of film F is lined up precisely with the center line of the folding head, or in other words whether or not adjusting means 64 is precisely located.

The pre-folded film from pre-folding section 61 is then passed over film unwind stand 37 which is altered only to the extent of providing a pressure roller 68 to press against driven cradle roller 43 to maintain the film in frictional contact therewith. Pressure roller 68 is pivotally mounted on arm 69 which in turn is pivotally mounted at 71 to unwind stand 37. A spring 72 may be provided to load pressure roller 68 to keep the film in contact with cradle roll 43. From cradle roll 43 the film is passed over idler roll 48 under dancer roll 49 and over idler rolls 51 to film inverting head 38 in the same manner as above.

Film inverting head 38 as mentioned above, is a U-shaped member oriented at an angle both to the path of the packages P from right to left through apparatus 21, and to the path of film F from unwind stand 37. Film inverting head 38 has parallel arms 75 and 76 both of which extend horizontally with the one oriented vertically above the other, and with lower arm 76 extending beneath table 41 of package inserting section 24. The portion 77 of the U-shaped member comprising film inverting head 38 connecting parallel arms 75 and 76 is preferably semi-circular in shape and is located to the right rear relative to the other portions of film inverting head 38. Preferably the normal to the angle at which the film inverting head 38 is oriented approximately bisects the angle between the axis of package travel through the machine and the axis of the film path from film unwind stand 37 to film inverting head 38. Most conventiently, since it is easier to make things square, film unwind stand 37 is oriented such that the film passes at 90° to the axis of package travel, and therefore the film inverting head 38 is normally set at an angle of about 45°. Neither of these angles appears to be particularly critical. The only basic requirement appears to be that the folded film comes from the rear portion of the machine well out of the path of the packages through the machine, and that the film inverting head 38 be set at an angle the normal of which approximately bisects the angle between the two.

Figure 7:
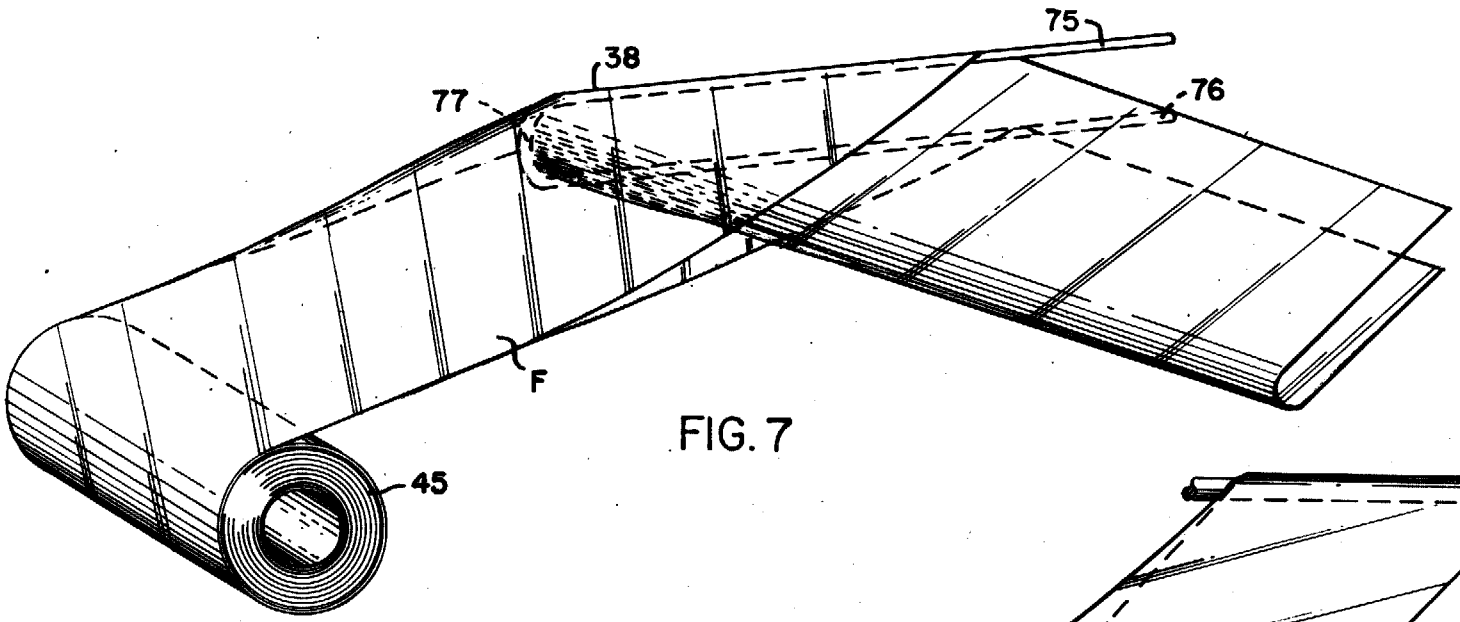
FIG. 7 is a rear perspective showing the detail of the operation of the film inverting means of the present invention.

Film F is led from film unwinding stand 37 toward film inverting head 38 with the folded edge toward the right (as in FIG. 1) and adjacent to rounded portion 77. The film is preferably brought in at an elevation such that the web of film coming from the unwind is at the same level as the center of the inverting head. This is accomplished by adjusting the vertical location of idler roll 51. Thus the distance the film has to travel around the head is exactly the same for the top web of film as it is for the bottom web of film, since the fold is located at the center of curve portion 77, insuring that when the film comes off the inverting head the top and bottom edges of the film will meet together under the front sealing jaws. On the other hand if it is desired, for any reason, not to have the top and bottom edges meet either the top or bottom edges may be moved toward the front by merely displacing idler roll 51 above or below the center line position. The film is unfolded to the extent that the free sides are extended above and below arms 75 and 76 respectively in contact with the outer edges thereof with the inner side of the film at the center fold portion being in contact with the outer side of rounded portion 77. The film is then tucked inside of film inverting head 38 and extended toward the left in the direction of the path of travel of packages P therethrough. This turns the film inside out as shown in FIGS. 7 and 8 with the center fold parallel to the path of travel of the packages toward the rear of apparatus 21 and the free edges toward the front of apparatus 21.

In view of the path of travel of film F from film unwind stand 37 to the outside of film inverting head 38 and back through the inside of film inverting head 38 toward sealing section 25, film-inverting head is most conveniently formed of a length of round stainless steel stock. Since the film comes in from the back on the outside and leaves toward the left on the inside any type of fabrication could be used as long as the surfaces actually contacting the film are sufficiently smooth and rounded as required, and as long as the extremities of the structure extend beyond the width of the widest film to be used. Thus in the case of the particular film inverting head 38 shown in FIG. 1, for example, arms 75 and 76 extend to the front left corner of package inserting section 24 where they are joined to vertical post 78 which in turn is fastened to horizontal support member 79 upon which table 41 is mounted. A brace 81 may be provided from the midpoint of curved portion 77 parallel to the path of travel of package P and the film F (from inverting head 38 to sealing section 25) to a bracket 82 mounted on the left side of support member 79 beyond the edge of the widest folded film intended to be used. The flat sides of film F coming from film unwind stand 37 to inverting head 38 pass above and below brace 81 while the folded edge of film F as it goes from inverting head 38 to sealing section 25 travels in front of brace 81 parallel and in close proximity thereto.

Figure 8:
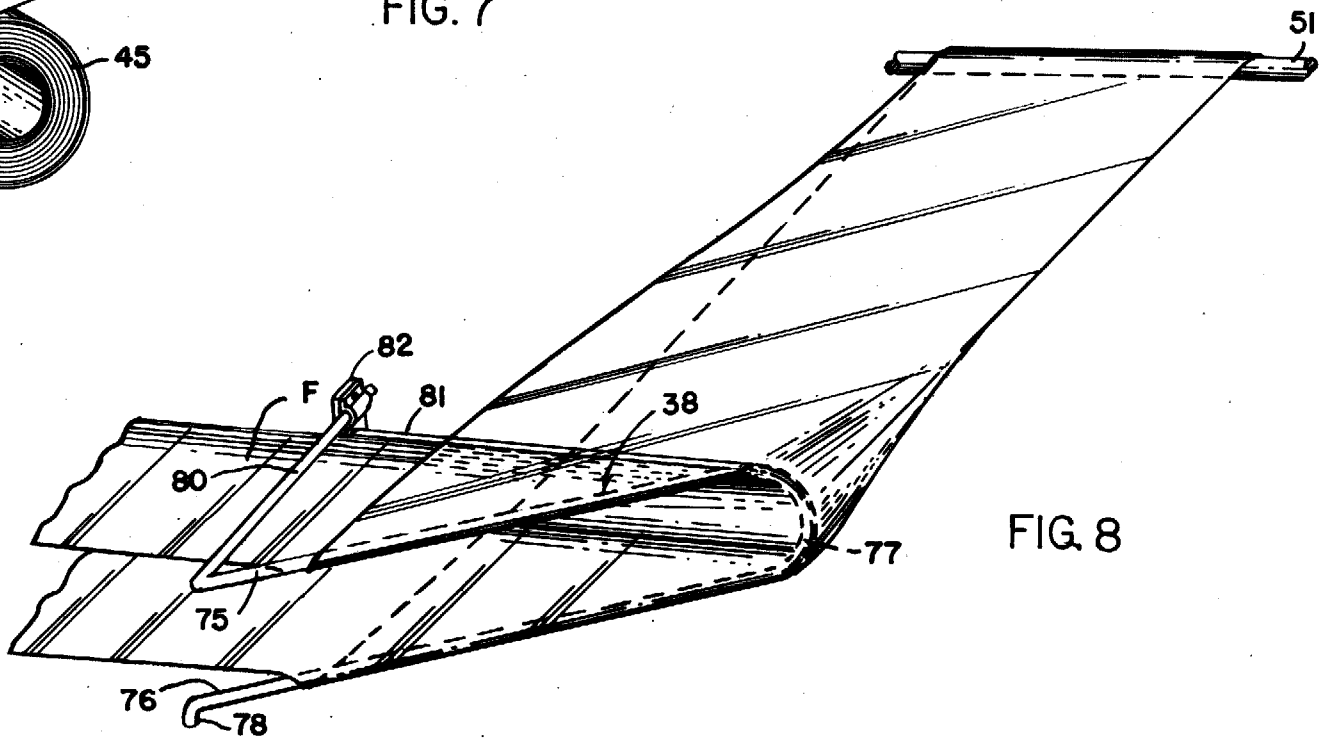
FIG. 8 is a front perspective showing an alternative form of film inverting means.
Figure 9:
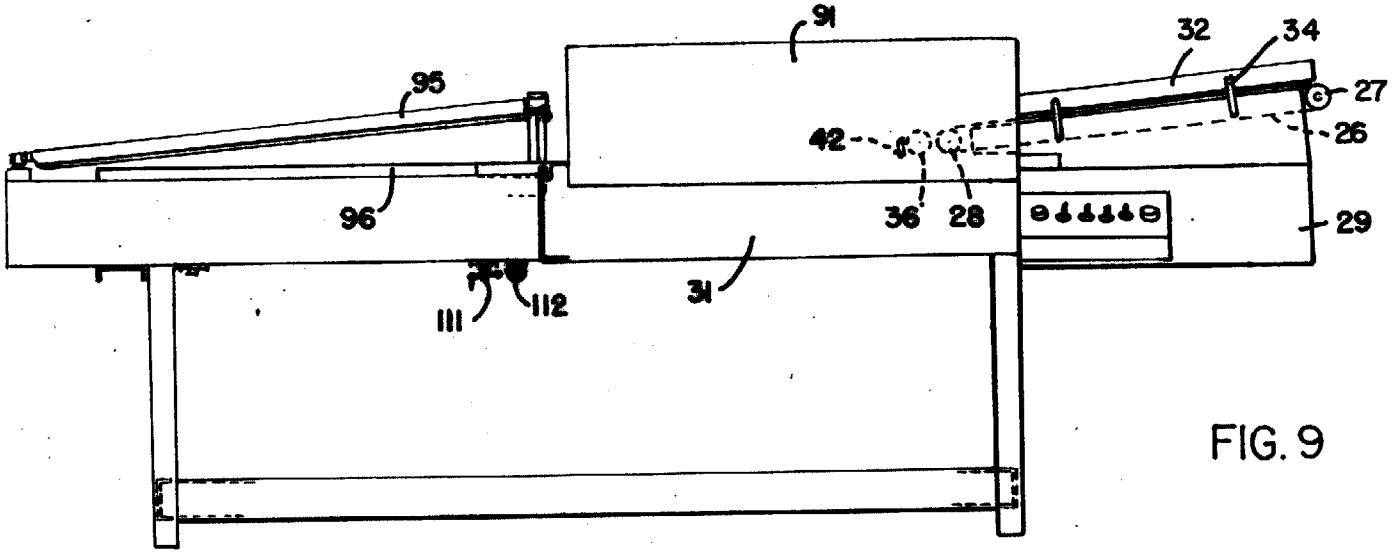
FIG. 9 is a front elevation of the apparatus shown in FIG. 1.

FIG. 8 shows a variant wherein front vertical mounting post 78 is terminated at lower arm 76 rather than upper arm 75. This leaves the front of inverting head 38 open and free of obstruction which is a great advantage when the machine is adapted for manual operation. In this variation, the front end of upper arm 75 is connected to brace 80 which in turn extends to bracket 82.

It will be understood, of course, that the terms horizontal and vertical as used herein refer to the mutual relationship of the parts to an arbitrary internal reference plane which, for example, could be taken as the plane of the lower sealing jaws, and does not necessarily refer to the floor or other external reference plane.

The use of center folded film and the horizontally extending U-shaped film inverting head has a number of advantages. One is that the inverting head opens up the film uniformly and permits easy insertion of packages P therethrough as they are slid across table 41 of package inserting section 24 which table extends into the film inverting head 38. While it is desirable to use a low profile inverting head for low profile packages, and a high profile inverting head for high profile packages, a wide range of package heights can be run through any given size inverting head. Thus a 3" high head can be used for any packages between ⅛" and 2½" high and a 4½" high inverting head will handle packages between ½" and 4" high. This wide range means that relatively few change-over parts are required to handle a wide assortment of package sizes which of course, minimizes change-over time.

As pointed out above in describing the infeed section, the apparatus is normally operated so that the front edge of the package is lined up generally with the front sealing jaw in sealing section 25. Thus width adjustment is accomplished merely by moving film-inverting head 38 in or out so that rounded portion 77 just clears the rear edge of the package. As will be explained below, horizontal support means 79 is adapted to slide in and out relative to frame 31 to accomplish this. While theoretically a single width of film could be used for all widths of packages, it is preferable, in order to avoid excess waste of film, to substitute rolls of a proper width when the width of a package is changed.

Since, as will be explained below, the film is advanced by the package itself and the package is pushed through the film inverting head 38 by insertion arm 42 onto sealing section 25 no adjustment is necessary to compensate for changes in the length of the package. In this manner the film is pulled through the film-inverting head. Since the film is fed to the inverting head from the roll of folded film in such a manner that the fold is to the far right as viewed in FIG. 1 and the open edges of the film are to the far left, the film tracks over the inverting head in such a manner that the fold stays at the curved portion of the inverting head and the edges stay to the far left. In passing over the inverting head, the film is turned inside out providing an opening into which the package can be inserted; in fact, the film is actually wrapped around the package by placing the outside of the film against the package. The angle of the inverting head is such that the folded portion of the film tends to stay to the rear of the machine, as viewed in FIG. 1, and the open edges tend to stay to the front and thus the film tends to be self-tracking and self-correcting. If for any reason the fold is offset on any package, the offset is corrected by the next two or three packages. This is quite important in the L-type sealer since in order to form the front seal, the two edges of film must lay one over the other in the seal region. Obviously, if one of the edges of film pulls back over the package, only one layer of film will lay under the sealing jaws and no seal will result.

Package-inserting section 24 comprises table 41 and reciprocal insertion arm 42. Table 41 extends from beneath the end of package infeed conveyor 26 or accelerator roll 36 if one is provided through film inverting head 38 to the leading edge of sealing section 25. Table 41 in extending through inverting head 28 extends above lower arm 76 thereof with sufficient clearance therefrom to permit the free passage of the lower portion of folded film F. Table 41 is mounted along its front edge on horizontal sliding support member 79 which extends beneath the lower arm 76 of film inverting head 38 and to which film inverting head 38 is attached. Support member 79 is mounted on main frame 31 in such manner as to be movable inwardly and outwardly at right angles to the path of packages through the apparatus. The front edge of sliding support member 79 extends in a downwardly extending flange 83 to which horizontal support rods 90 are attached. Support rods 90 pass through cooperating holes in the front of main frame member 81. The rear edge of support member 79 as shown, is provided with two horizontally extending rectangular tab members 84 and 85 which rest on a cooperating horizontal surface of frame member 31. Tab members 84 and 85 are each provided with an internal longitudinally extending slot 86 and 87 through which extends a fastening member 88 and 89 fastened to frame member 31. Adjustment for the width of packages is made by loosening fastening members 88 and 89, moving support member 79 backwardly and forwardly to the desired position (thus moving both table 41 and film inverting head 38) and retightening fastening members 88 and 89.

Insertion arm 42 is mounted on a carrier assembly which rides on linear ball bearings on a guide rod inside cylinder housing 91 which, in turn, is mounted on the forward edge of support member 79. The cable from the air cylinder piston is fastened to this carrier and thus as the piston moves back and forth in the cylinder, the carrier is caused to move back and forth in the opposite direction on the guide rod, thus moving insertion arm 42. The normal position for insertion arm 42 is at a position beneath the discharge end of infeed conveyor 26. As the package P drops from conveyor 26 it passes over insertion arm 42 and strikes actuating switch 92 mounted near the top of table 41. Switch 92 upon being actuated causes a solenoid to operate which in turn admits air to the air cylinder 91. The particular type of cylinder that has been found to be most useful is one provided with a pulley at both ends and with a cable passing around both pulleys and with both ends attached to a piston within the cylinder. As the piston moves from one end of the cylinder to the other, the cable moves in the opposite direction along the outside of the cylinder. This cable is fastened to insertion arm 42 which is guided by linear ball bearings on a hardened steel rod. Upon actuation insertion arm 42 moves from right to left across table 41 contacting the rear of package P which has been deposited thereon from infeed conveyor 26 pushing package P across table 41 through film inverting head 38 onto table 101 in sealing section 25. As the forward edge of package P moves across the transverse sealing member of sealing section 25 it contacts the transverse seal in film F formed by the prior sealing operation. This, together with the folded edge, forms two sides of a pouch surrounding package P. As package P continues to move forward into sealing section 25 pushed by insertion arm 42 it drags film F along with it. The stroke of insertion arm 42 is adjusted so that it deposits package P entirely within sealing section 25 just beyond the transverse sealing jaws. Insertion arm 42 is offset as indicated in order to clear mounting post 78 of film inverting head 38, although the edge that contacts package P is transverse to the path of travel of package P. At the forward end of the stroke of insertion arm 42 a limit switch (not shown) is contacted which causes the air supply to the cylinder to be reversed, returning insertion arm 42 to its initial position beneath the end of infeed conveyor 26. As insertion arm 42 moves away from sealing section 25 it contacts a second limit switch (not shown) which initiates the sealing cycle.

Sealing section 25 is in all essential details the device described and claimed in my copending U.S. patent application Ser. No. 626,117, filed Mar. 27, 1967 entitled "Apparatus for Heat Sealing Plastic Film." Reference to my copending application is specifically made for details of the construction and operation of the sealing section 25.

In essence sealing section 25 comprises an upper and lower transverse sealing jaw 93 and 94 and an upper and lower longitudinal sealing jaw 95 and 96. The upper sealing jaws 93 and 95 are provided with heated means for forming seals; are joined together to form an L-shaped structure to form a continuous L-shaped seal; and are pivotally mounted as indicated at 97 and 98 at their free ends along a diagonal pivot axis for reciprocal motion about this axis. The upper sealing jaws are pivoted downwardly into contact with the lower sealing jaws during the sealing operation and are raised to an elevated position between sealing operations. Lower sealing jaws 94 and 96 are mounted on frame 31 so that the sealing surface is at sufficiently lower level than table 41 of package insertion section 24, to permit easy passage of the lower level of film F. Preferably the sealing jaws are of the so-called impulse type designed not only to form a seal between the two layers of film, but also to sever the film along the middle of the seal leaving a seal on both sides of the severed portion.

Figure 10:
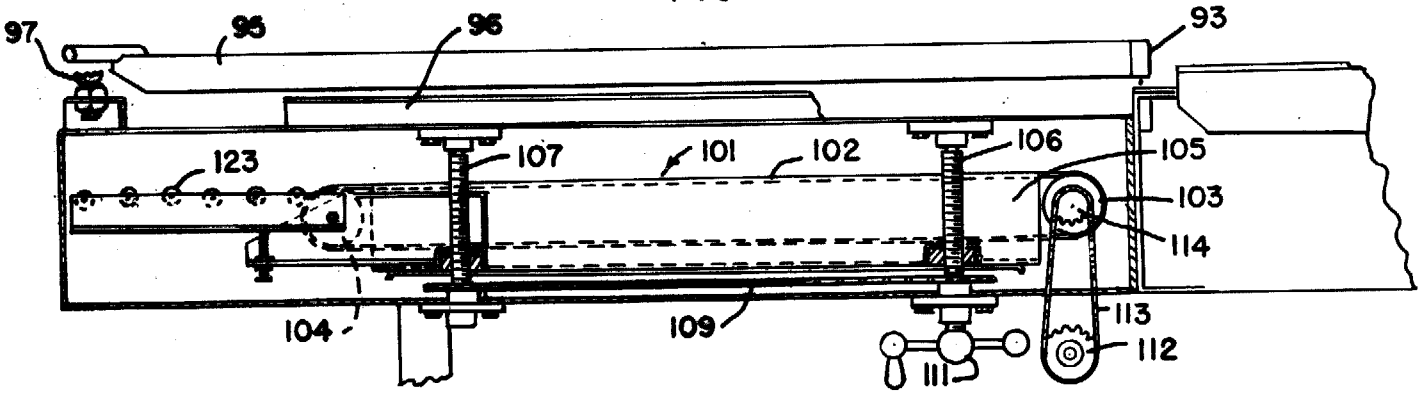
FIG. 10 is a front elevation partially in section showing details of the left-hand portion of FIG. 9.

Within the area limited by the inner edges of lower sealing jaws 94 and 96 there is provided a sealing table 101. Table 101 is a conveyor comprising a belt 102 mounted over two horizontal transverse rollers 103 and 104 which are mounted on frame 105 (see FIG. 10). Table 101 is adjustable vertically relative to main frame 31, the mounting for frame 105 comprising three jack screw elements 106, 107, 108 arranged in a triangular arrangement with elements 106 and 107 on one side of conveyor belt 102, and element 108 on the other. The screw portions of jack screw elements 106, 107 and 108 are pivotally mounted on main frame 31 and the three screw portions are rotationally connected by chain 109 which passes around sprockets mounted on each of the screw shafts. The rotation of crank 111 mounted on the screw portion of jack screw element 106 moves table 101 up or down as the case may be.

In use the height of sealing table 101 is adjusted carefully so that the sealing jaws are located at the midpoint of the package. This is quite important in the case of folded film since the distance that the film travels around the bottom of the package should always be equal to the distance that the film travels around the top of the package when the film is joined at the fold at the rear of the package. Since this distance should also be equal left and right as well as front to rear the seal should be at the center of the package.

Belt 102 of sealing table 101 is provided with a drive means indicated by sprocket 112 and drive chain 113 and by sprocket 114 on pulley 103. After the sealing arms open the drive means for belt 102 is actuated through a timer causing the belt to move for a predetermined length of time sufficient to cause the package to move off of table 101 to the next station. Upon the expiration of the predetermined time belt 102 is stopped and remains stationary until after the next succeeding package has been received thereon and the sealing operation has been completed on this next succeeding package.

A guide member 115 mounted on bracket 116 which in turn is mounted on frame 105 is provided to keep the package in the proper position relative to the sealing jaws as a package P is introduced onto table 101 by the action of insertion arm 42. As shown the guide member 115 is mounted on two horizontal rods 117 and 118 which in turn pass through holders 119 and 120 in bracket 116. Guide member 115 is thus easily adjustable to accommodate packages of different widths. Although not shown the guide member 115 can be provided with a stop member which extends into the path of travel of package P to prevent overtravel of the package. It is anticipated that as the speed of the machine is increased the momentum of the package may be such as it is pushed onto sealing table 101 by insertion arm 42 the package will be thrown beyond the desired sealing position. A reciprocal stop member in guide member 115 would prevent this. Such a stop could be connected to the controls for the drive means of belt 102 in such manner that the stop member would be retracted and inoperative during the period that the belt was operating and would be extended and operative while the belt is stopped.

Upon being discharged from sealing table 101 the package P is normally moved onto a conveyor belt of a heated shrink tunnel for the purpose of shrinking film as into close contact with package P. The shrink tunnel not being part of the present invention is not shown, but a suitable such tunnel is disclosed and claimed in my prior United States Letters Pat. No. 3,312,811, dated Apr. 4, 1967 entitled "Shrink Tunnel." While not really necessary, it has been found that a section of roller conveyor 123 mounted on frame 105 helps provide a smooth transfer from the conveyor of table 101 to the conveyor of the shrink tunnel.

A scrap removal system should be provided to remove the selvage edge of film that is cut off from the front edge of the package by the front (longitudinal) sealing jaws 95 and 96. Unless this selvage edge is removed it will lay in the region of the seal, tend to reweld to other packages and eventually make it impossible to obtain a good seal. The best technique for removing the selvage edge appears to be the use of a vacuum hose as indicated at 125 mounted with its opening adjacent the outer edge of lower longitudinal sealing jaws 96 at a position sufficiently removed from the lower transverse sealing jaw 94 that is well beyond the extent of any package coming onto sealing section 25. Several types of suction blowers and shop vacuum cleaners have been used successfully. The important thing is to regulate the vacuum of the hose so that a sufficient pull is available to strip the film from the jaws of the sealer where the film has a slight tendency to stick and yet not so much as to pull film from the unwind mechanism or to pull the film out of the seal area.

A second advantage for using a vacuum source for a scrap removal system is that this keeps a constant uniform tension on the front edges of the film. This causes the free edges of the film to move toward the front of the inverting head tending to keep the film smooth and reasonably taut thereon and making the tracking of the film through the inverting head more certain.

To summarize the operation of the packaging apparatus packages P which are to be overwrapped with a shrink film are deposited one by one on package infeed conveyor 26. Assuming the packaging apparatus 21 to be empty, infeed conveyor 26 would be in operation and would move package P onto table 41 of package insertion section 24 where package P hits switch 92. The action of switch 92 stops infeed conveyor 26 and actuates a relay that actuates package insertion arm 42 which in its normal position is maintained beneath the discharge of infeed conveyor 26. When the sealing arm of sealing section 25 is in its raised position package insertion arm 42 moves across table 41 pushing the package P before it, through film inverting head 38 and onto table 101 of sealing section 25. At the end of its stroke the direction of arm is reversed and as it passes out of sealing section 25 it actuates a limit switch that actuates the sealing section. As package insertion arm 42 returns to its normal position beneath the discharge of conveyor 26 another limit switch is actuated which restarts conveyor 26 permitting the next succeeding package to be deposited onto table 41 again actuating switch 92. An interlock arrangement for package insertion arm 42 insures that arm 42 can move forward only when the sealing jaws are in their raised position. Thus since table 101 of sealing section 25 comprises a discharge conveyor which is turned on for a predetermined time as soon as the sealing jaw separates upon the completion of the seal the operation of the apparatus is entirely automatic.

While the machine itself has been described as one which is entirely automatic in operation, it is obvious that inverting head 38 could easily well be used manually to great advantage. Packages could merely be inserted by hand through inverting head 38 onto sealing area 25. Since the inverting head keeps the film open and centered this can be done much more rapidly and much more easily than in the conventional machines where the film has to be separated by hand or by other means before the article can be inserted. Obviously, if only manual operation is desired any L-type sealer can be provided with just the film unwind and inverting section 23 which comprises film unwind stand 37 and film inverting head 38. As mentioned above, where the inverting head 38 is intended for use manually, the variation shown in FIG. 8 wherein the front of the inverting head is entirely open is preferred. The use of the motorized film feed is desirable to avoid excess film tension.

Even in the case of the automatic machine as described it is sometimes necessary with certain articles to be wrapped to feed these articles manually because the articles for one reason or another are not amenable to automatic feed. Since air cylinder housing 91 extends upwardly at the front of table 41 and would be in the way were the machine to be used for manual operation, making the feeding of articles by hand somewhat awkward, it is preferable to provide a substitute horizontal sliding support member 79 which is provided only with table 41 and film inverting head 38. Where it is intended to use both manual and automatic package inserting sections 24 support means can be provided immediately under section 24 in frame 31 to store the particular section which, at that moment, is not being used and sufficiently long leads can be provided for the connections to the air cylinder in housing 91, and to the several limit switches that these need not be disconnected every time the automatic section 24 is moved into and out of place.

I claim:

[1. In an apparatus for wrapping packages in a thermoplastic film having a film supply means wherein thermoplastic film is supplied as an elongated length folded back upon itself along a longitudinal axis to form a top and a bottom web portion overlying one another in close juxtaposition one to the other and is directed into the apparatus along a horizontal path with the folded edge on one side and the free edges on the other, and a film sealing means having at least an intermittently operated transverse sealing means for sealing said folded film transversely between said folded edge and said free edges a film inverting head located between said film supply means and said film sealing means in the path of package flow through said apparatus in such a manner that the fold line in said folded film may be passed through the center line of the inverting head, and that the film is redirected and turned inside out in passing over and through said inverting head, said inverting head providing an opening into which a package may be inserted between the connected webs of said film said inverting head comprising a pair of spaced arms operably associated at one end, said arms intersecting said path of package flow with one arm extending above and the other extending below said path of package flow and being directed at an angle both to the path of package flow and to the path of film travel from said supply means to said head with the operably associated end of said head substantially aligned with the path of the folded edge of said film whereby after a first transverse seal has been made in said length of film, the passage of a package along said path of package flow through said inverting head and across said transverse sealing means draws enough film from said film supply means over and through said inverting head to surround said package.]

[2. In an apparatus for wrapping packages in a thermoplastic film having a film supply means wherein thermoplastic film is supplied as an elongated length folded back upon itself along a longitudinal axis to form a top and a bottom web portion overlying one another in close juxtaposition one to the other and is directed into the apparatus along a horizontal path with the folded edge on one side and the free edges on the other, and a film-sealing means having at least an intermittently operated transverse sealing means for sealing said folded film transversely between said folded edge and said free edges a film inverting head located between said film supply means and said film sealing means in the path of package flow through said apparatus in such a manner that the fold line in said folded film may be passed through the center line of the inverting head, and that the film is redirected and turned inside out in passing over and through said inverting head, said inverting head providing an opening into which a package may be inserted between the connected webs of said film said inverting head comprising a pair of spaced arms operably associated at one end, said arms intersecting said path of package flow with one arm extending above and the other extending below said path of package flow and being directed at an angle both to the path of package flow and to the path of film travel from said supply means to said head with the operably associated end of said head substantially aligned with the path of the folded edge of said film the path of said film travel to said head being substantially at right angles to the path of said package flow, and the said head being set at an angle of about 45° to both said path of package flow and said path of film travel whereby after a first transverse seal has been made in said length of film, the passage of a package along said path of package flow through said inverting head and across said transverse sealing means draws enough film from said film supply means over and through said inverting head to surround said package.]

[3. In an apparatus for wrapping packages in a thermoplastic film having a film supply means wherein the thermoplastic film is supplied as an elongated length folded back upon itself along a longitudinal axis to form a top and a bottom web portion overlying one another in close juxtaposition one to the other and is directed into the apparatus along a horizontal path with the folded edge on one side and the free edges on the other, and a film-sealing means having at least an intermittently operated transverse sealing means for sealing said folded film transversely between said folded edge and said free edges a film inverting head located between said film supply means and said film sealing means in the path of package flow through said apparatus in such a manner that the fold line in said folded film may be passed through the center line of the inverting head, and that the film is redirected and turned inside out in passing over and through said inverting head, said inverting head providing an opening into which a package may be inserted between the connected webs of said film said inverting head comprising a pair of spaced arms operably associated at one end, said arms intersecting said path of package flow with one arm extending above and the other extending below said path of package flow and being directed at an angle both to the path of package flow and to the path of film travel from said supply means to said head with the operably associated end of said head substantially aligned with the path of the folded edge of said film the path of said film travel to said head being substantially at right angles to the path of said package flow, and the said head being set at an angle of about 45° to both said path of package flow and said path of film travel the film inverting head being mounted to move in a direction normal to said path of package flow whereby adjustment for packages of varying width may be accomplished merely by moving said film inverting head whereby after a first transverse seal has been made in said length of film, the passage of a package along said path of package flow through said inverting head and across said transverse sealing means draws enough film from said film supply means over and through said inverting head to surround said package.]

[4. In an apparatus for wrapping packages in a thermoplastic film having a film supply means wherein thermoplastic film is supplied as an elongated length folded back upon itself along a longitudinal axis to form a top and a bottom web portion overlying one another in close juxtaposition one to the other and is directed into the apparatus along a horizontal path with the folded edge on one side and the free edges on the other, and a film sealing means having at least an intermittently operated transverse sealing means for sealing said folded film tranversely between said folded edge and said free edges a film inverting head located between said film supply means and said film sealing means in the path of package flow through said apparatus in such a manner that the fold line in said folded film may be passed through the center line of the inverting head, and that the film is redirected and turned inside out in passing over and through said inverting head, said inverting head providing an opening into which a package may be inserted between the connected webs of said film said inverting head comprising a pair of spaced arms operably associated at one end and oriented substantially parallel one above the other, said arms intersecting said path of package flow with one arm extending above and the other extending below said path of package flow and being directed at an angle both to the path of package flow and to the path of film travel from said supply means to said head with the operably associated end of said head substantially aligned with the path of the folded edge of said film whereby after a first transverse seal has been made in said length of film, the passage of a package along said path of package flow through said inverting head and across said transverse sealing means draws enough film from said film supply means over and through said inverting head to surround said package.]

[5. In an apparatus for wrapping packages in a thermoplastic film having a film supply means wherein thermoplastic film is supplied as an elongated length folded back upon itself along a longitudinal axis to form a top and a bottom web portion overlying one another in close juxtaposition one to the other and is directed into the apparatus along a horizontal path with the folded edge on one side and the free edges on the other, and a film sealing means having at least an intermittently operated transverse sealing means for sealing said folded film transversely between said folded edge and said free edges a film inverting head located between said film supply means and said film sealing means in the path of package flow through said apparatus in such a manner that the fold line in said folded film may be passed through the center line of the inverting head, and that the film is redirected and turned inside out in passing over and through said inverting head, said inverting head providing an opening into which a package may be inserted between the connected webs of said film said inverting head comprising a pair of spaced arms operably associated at one end, said arms intersecting said path of package flow with one arm extending above and the other extending below said path of package flow and being directed at an angle both to the path of package flow and to the path of film travel from said supply means to said head with the operably associated end of said head substantially aligned with the path of the folded edge of said film the path of package flow including a package support means which extends through said film inverting head whereby after a first transverse seal has been made in said length of film, the passage of a package along said path of package flow through said inverting head and across said transverse sealing means draws enough film from said film supply means over and through said inverting head to surround said package.]

[6. In an apparatus for wrapping packages in a thermoplastic film having a film supply means wherein thermoplastic film is supplied as an elongated length folded back upon itself along a longitudinal axis to form a top and a bottom web portion overlying one another in close juxtaposition one to the other and is directed into the apparatus along a horizontal path with the folded edge on one side and the free edges on the other, and a film sealing means having at least an intermittently operated transverse sealing means for sealing said folded film transversely between said folded edge and said free edges a film inverting head located between said film supply means and said film sealing means in the path of package flow through said apparatus in such a manner that the fold line in said folded film may be passed through the center line of the inverting head, and that the film is redirected and turned inside out in passing over and through said inverting head, said inverting head providing an opening into which a package may be inserted between the connected webs of said film said inverting head comprising a pair of spaced arms operably associated at one end, said arms intersecting said path of package flow with one arm extending above and the other extending below said path of package flow and being directed at an angle both to the path of package flow and to the path of film travel from said supply means to said head with the operably associated end of said head substantially aligned with the path of the folded edge of said film the path of package flow including a package support means which extends through said film inverting head and wherein automatic means are provided for feeding packages one by one onto and across said support means through said inverting head across said transverse sealing means whereby after a first transverse seal has been made in said length of film, the passage of a package along said path of package flow through said inverting head and across said transverse sealing means draws enough film from said film supply means over and through said inverting head to surround said package.]

[7. In an apparatus for wrapping packages in a thermoplastic film having a film supply means wherein thermoplastic film is supplied as an elongated length folded back upon itself along a longitudinal axis to form a top and a bottom web portion overlying one another in close juxtaposition one to the other and is directed into the apparatus along a horizontal path with the folded edge on one side and the free edges on the other, and a film sealing means having an intermittently operated sealing means for sealing said folded film both transversely between said folded edge and said free edges and longitudinally along said free edges a film inverting head located between said film supply means and said film sealing means in the path of package flow through said apparatus in such a manner that the fold line in said folded film may be passed through the center line of the inverting head, and that the film is redirected and turned inside out in passing over and through said inverting head, said inverting head providing an opening into which a package may be inserted between the connected webs of said film said inverting head comprising a pair of spaced arms operably associated at one end, said arms intersecting said path of package flow with one arm extending above and the other extending below said path of package flow and being directed at an angle both to the path of package flow and to the path of film travel from said supply means to said head with the operably associated end of said head substantially aligned with the path of the folded edge of said film whereby after a first transverse seal has been made in said length of film the passage of a package along said path of package flow through said inverting head and across said transverse sealing means draws enough film from said film supply means over and through said inverting head to surround said package.]

*8. An in-line L-sealer for wrapping packages in a thermoplastic film comprising:*

*means for providing an in-line path of package flow;*

*film supply means including a power unwind mechanism for supplying thermoplastic film as an elongated length folded back upon itself along a longitudinal axis along a path of film travel to form a top and a bottom web portion overlying one another in close juxtaposition one to the other to form a folded edge and free edges of said film and for directing said film into the apparatus along a horizontal path with the folded edge on one side and the free edges on the other, said power unwind mechanism responsive to package advance against a transverse seal in the folded film to provide film moving substantially tension-free through the apparatus;*

*film sealing means intermittently operable on substantially tension-free film for simultaneously making a longitudinal seal and the trailing transverse seal for the same package by sealing said folded film transversely between said folded edge and said free edges and along said free edges, said trailing transverse seal simultaneously making the leading transverse seal for the next package and severing the film transversely between the successive packages;*

*a film inverting head having a center line located between said film supply means and said film sealing means in said path of package flow through said apparatus in such a manner that the fold line in said folded film may be passed through the center line of the inverting head, and that the film is redirected and turned inside out in passing over and through said inverting head, said inverting head providing an opening into which a package may be inserted between the connected webs of said film;*

*said inverting head comprising a pair of spaced arms operably associated at one end and remaining in spaced relation past said free edges of said film at the other end, said arms intersecting said path of package flow with one arm extending above and the other extending below said path of package flow and being directed at an angle both to the path of package flow and to the path of film travel from said supply means to said head with the operably associated end of said head substantially aligned with the path of the folded edge of said film and the spaced arms at said other end of said head extending beyond the free edges of said film,*

*whereby after a first transverse seal has been made in said length of film, the passage of each subsequent package along said path of package flow through said inverting head engages the previously made transverse seal and further passage along said path across said transverse sealing means draws enough film from said film supply means to be delivered relatively tension-free over and through said inverting head to surround said package and provide tension-free film at said transverse sealing means at the end of said passage.*

* * * * *

UNITED STATES PATENT AND TRADEMARK OFFICE

CERTIFICATE OF CORRECTION

PATENT NO. : RE 30010

DATED : May 29, 1979

INVENTOR(S) : F. Garrett Shanklin

It is certified that error appears in the above-identified patent and that said Letters Patent are hereby corrected as shown below: Claims 9 and 10 written below were omitted from the printed text of original U. S. Letters Patent No. RE 30010, issued May 29, 1979, and are to be incorporated therein:

9. Apparatus according to claim 8 wherein:
the path of said film travel to said film inverting head is substantially at right angles to said path of package flow, and
said film inverting head is set at an angle of about 45° to both said path of package flow and said path of film travel and including,
means for mounting said film inverting head to move in a direction normal to said path of package flow whereby adjustment for packages of varying width may be accomplished merely by adjusting the position of said film inverting head in said normal direction.

10. Apparatus according to claim 8 in which said means for providing an in-line path of package flow includes means for automatically feeding packages at spaced intervals along said path into said inverting head and means for intermittently advancing said packages through said inverting head to press against a freshly made transverse seal in said folded film whereby said film is directed into the apparatus.

On the cover sheet "1 Claim" should read -- 3 Claims --.

Signed and Sealed this

*Twenty-seventh* Day of *November 1979*

[SEAL]

*Attest:*

RUTH C. MASON
*Attesting Officer*

LUTRELLE F. PARKER
*Acting Commissioner of Patents and Trademarks*